United States Patent
Watanabe

(10) Patent No.: US 11,431,862 B2
(45) Date of Patent: Aug. 30, 2022

(54) TERMINAL AND STORAGE MEDIUM

(71) Applicant: KONICA MINOLTA, INC., Tokyo (JP)

(72) Inventor: Yukio Watanabe, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/353,874

(22) Filed: Jun. 22, 2021

(65) Prior Publication Data

US 2022/0014636 A1 Jan. 13, 2022

(30) Foreign Application Priority Data

Jul. 13, 2020 (JP) .............................. JP2020-119608

(51) Int. Cl.
| | |
|---|---|
| *G06F 3/12* | (2006.01) |
| *G06F 15/00* | (2006.01) |
| *G06K 1/00* | (2006.01) |
| *H04N 1/00* | (2006.01) |
| *G06F 3/01* | (2006.01) |

(52) U.S. Cl.
CPC ......... *H04N 1/00411* (2013.01); *G06F 3/016* (2013.01)

(58) Field of Classification Search
CPC ...... H04N 1/00411; G06F 3/016; G06F 3/017
See application file for complete search history.

(56) References Cited

U.S. PATENT DOCUMENTS

| | | | | |
|---|---|---|---|---|
| 2005/0275508 | A1* | 12/2005 | Orr ......................... | G08B 6/00 340/407.1 |
| 2012/0162143 | A1* | 6/2012 | Kai ...................... | H04M 1/0266 345/177 |
| 2015/0135080 | A1* | 5/2015 | Ji ........................... | G06F 3/167 715/728 |
| 2017/0208195 | A1* | 7/2017 | Yamamoto ............ | G06F 1/1637 |

FOREIGN PATENT DOCUMENTS

JP 2017130030 A 7/2017

* cited by examiner

*Primary Examiner* — Moustapha Diaby
(74) *Attorney, Agent, or Firm* — Buchanan Ingersoll & Rooney PC

(57) ABSTRACT

A portable terminal for controlling an apparatus includes: a display with a touchscreen; a vibrator that is configured to perform a vibration action of vibrating at least an operation surface of the touchscreen; and a hardware processor that determines whether or not the terminal is in a placed state of being placed on an object and causes the vibrator to perform the vibration action in response to a touch operation on the operation surface. When the terminal is in the placed state, the hardware processor causes the vibrator to perform the vibration action at first vibration intensity. When the terminal is not in the placed state, the hardware processor causes the vibrator to perform the vibration action at second vibration intensity that is lower than the first vibration intensity.

18 Claims, 12 Drawing Sheets

TERMINAL AND STORAGE MEDIUM

CROSS-REFERENCE TO RELATED APPLICATIONS

The entire disclosure of Japanese Patent Application No. 2020-119608 filed on Jul. 13, 2020 is incorporated herein by reference in its entirety.

TECHNICAL FIELD

The present disclosure relates to a terminal and a storage medium.

BACKGROUND

A stationary image forming apparatus, such as a multi-functional peripheral, may include a terminal that is detachable from the main body of the apparatus and that sends a control signal to the apparatus for operating the apparatus in response to receiving an input operation. A common type of such a terminal has a display for displaying the operation window and detects a touch operation made on the operation surface of the touchscreen of the display as an input operation. Further, according to JP2017-130030A, a terminal includes a vibrator that vibrates the terminal in response to a touch operation received on the operation surface (vibration response).

SUMMARY

However, the terminal may be in various states when receiving the touch operation. For example, the terminal may be mounted on the main body of the apparatus or may be held in the hand of a user (operator). Depending on the state of the terminal, the user may touch different parts of the terminal for different periods of time and may not perceive a vibration response. More specifically, depending on the state of the terminal, the vibration response may be too week to feel or may be too strong and annoying.

The known art has not taken into account whether or not the vibration response is perceivable to the user, and therefore may not provide an appropriate vibration response to the user.

Objects of the present invention include providing a terminal and a storage medium storing a program that can give more appropriate vibration responses to the user.

To achieve at least one of the abovementioned objects, according to an aspect of the present invention, there is provided a portable terminal for controlling an apparatus, including: a display with a touchscreen; a vibrator that is configured to perform a vibration action of vibrating at least an operation surface of the touchscreen; and a hardware processor that determines whether or not the terminal is in a placed state of being placed on an object and causes the vibrator to perform the vibration action in response to a touch operation on the operation surface, wherein when the terminal is in the placed state, the hardware processor causes the vibrator to perform the vibration action at first vibration intensity, and when the terminal is not in the placed state, the hardware processor causes the vibrator to perform the vibration action at second vibration intensity that is lower than the first vibration intensity.

According to another aspect of the present invention, there is provided a portable terminal for controlling an apparatus, including: a display with a touchscreen; a vibrator that is configured to perform a vibration action of vibrating at least an operation surface of the touchscreen; and a hardware processor that controls the vibration action of the vibrator, determines whether or not the terminal is in a placed state of being placed on an object, makes a prediction on whether a touch operation is to be performed on the operation surface by detecting an operation tool approaching the operation surface within a certain distance, and detects the touch operation performed on the operation surface with the operation tool, wherein when the terminal is in the placed state, the hardware processor causes the vibrator to start the vibration action in response to predicting the touch operation, and when the terminal is not in the placed state, the hardware processor causes the vibrator to start the vibration action in response to detecting the touch operation.

According to another aspect of the present invention, there is provided a portable terminal for controlling an apparatus, including: a display with a touchscreen; a first vibrator that is configured to perform a first vibration action of vibrating an operation surface of the touchscreen; a second vibrator that is configured to perform a second vibration action of vibrating a surface of the terminal opposite the operation surface; and a hardware processor that controls the first vibration action by the first vibrator and the second vibration action by the second vibrator and determines whether or not the terminal is in a placed state of being placed on an object, wherein when the terminal is in the placed state, the hardware processor causes the first vibrator to perform the first vibration action in response to a touch operation on the operation surface, and when the terminal is not in the placed state, the hardware processor causes the second vibrator to perform the second vibration action in response to the touch operation on the operation surface.

According to another aspect of the present invention, there is provided a non-transitory computer-readable storage medium storing a program that causes a computer of a portable terminal, the terminal being for controlling an apparatus and including a display with a touchscreen and a vibrator that is configured to perform a vibration action of vibrating at least an operation surface of the touchscreen, to function as a hardware processor that: determines whether or not the terminal is in a placed state of being placed on an object; and causes the vibrator to perform the vibration action in response to a touch operation on the operation surface, wherein when the terminal is in the placed state, the hardware processor causes the vibrator to perform the vibration action at first vibration intensity, and when the terminal is not in the placed state, the hardware processor causes the vibrator to perform the vibration action at second vibration intensity that is lower than the first vibration intensity.

According to another aspect of the present invention, there is provided a non-transitory computer-readable storage medium storing a program that causes a computer of a portable terminal, the terminal being for controlling an apparatus and including a display with a touchscreen and a vibrator that is configured to perform a vibration action of vibrating at least an operation surface of the touchscreen, to function as a hardware processor that: controls the vibration action of the vibrator; determines whether or not the terminal is in a placed state of being placed on an object; makes a prediction on whether a touch operation is to be performed on the operation surface by detecting an operation tool approaching the operation surface within a certain distance; and detects the touch operation performed on the operation surface with the operation tool, wherein when the terminal is in the placed state, the hardware processor causes the vibrator to start the vibration action in response to predicting the touch operation, and when the terminal is not in the placed state, the hardware processor causes the vibrator to start the vibration action in response to detecting the touch operation.

According to another aspect of the present invention, there is provided a non-transitory computer-readable storage medium storing a program that causes a computer of a portable terminal, the terminal being for controlling an apparatus and including: a display with a touchscreen; a first vibrator that is configured to perform a first vibration action of vibrating an operation surface of the touchscreen; and a second vibrator that is configured to perform a second vibration action of vibrating a surface of the terminal opposite the operation surface, to function as a hardware processor that: controls the first vibration action by the first vibrator and the second vibration action by the second vibrator; and determines whether or not the terminal is in a placed state of being placed on an object, wherein when the terminal is in the placed state, the hardware processor causes the first vibrator to perform the first vibration action in response to a touch operation on the operation surface, and when the terminal is not in the placed state, the hardware processor causes the second vibrator to perform the second vibration action in response to the touch operation on the operation surface.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION OF THE EMBODIMENTS

Hereinafter, an embodiment of the present invention is described with reference to the drawings. However, the scope of the present invention is not limited to the disclosed embodiment.

First Embodiment

Figure 1:
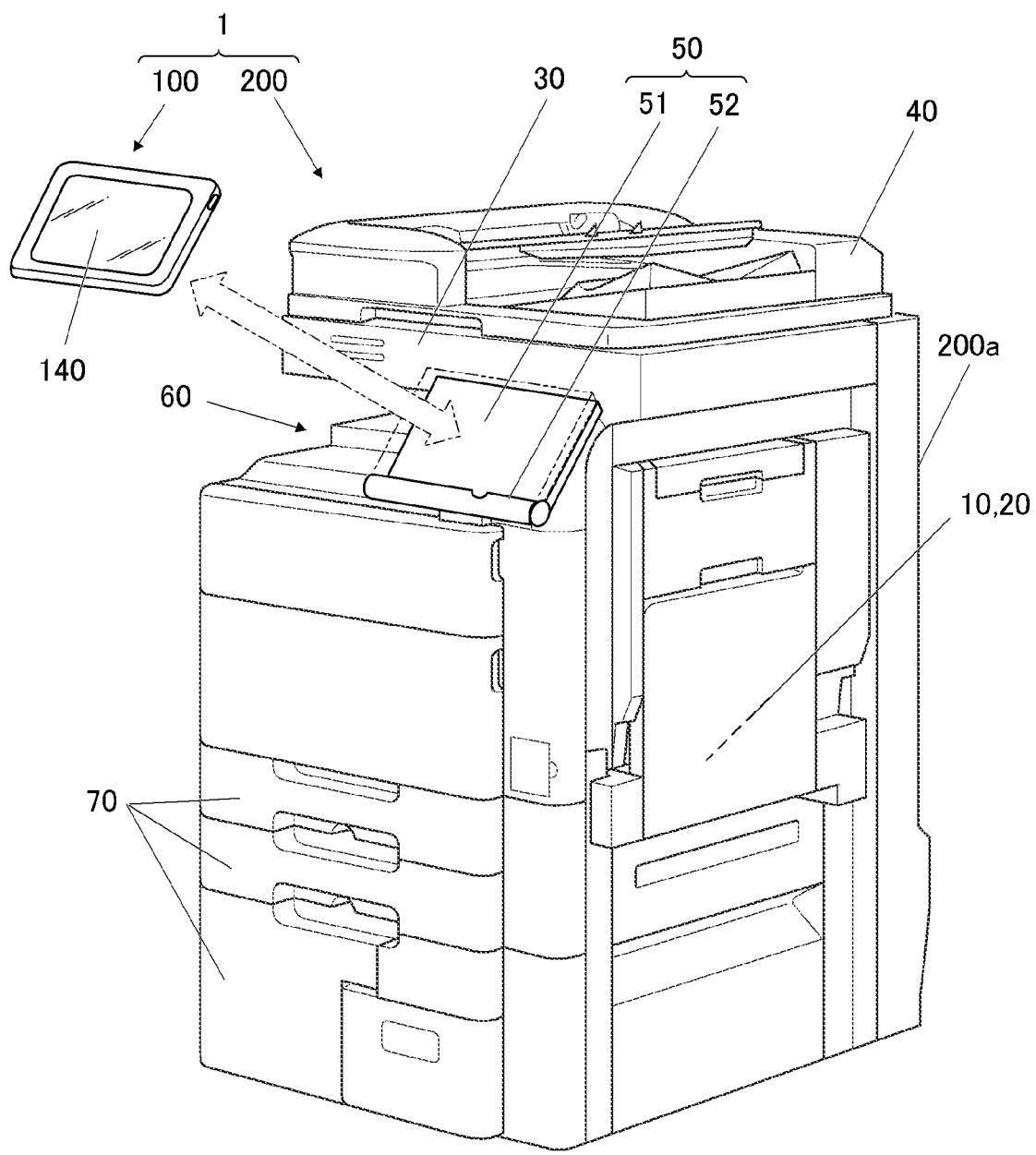
FIG. 1 is a schematic configuration of an image forming apparatus in a first embodiment.

FIG. 1 is a schematic configuration of an image forming apparatus 1 in a first embodiment.

The image forming apparatus 1 in this embodiment is an electrophotographic multifunctional apparatus that forms color images. The image forming apparatus 1 has functions as a scanner, a color copier, and a laser printer.

As shown in FIG. 1, the image forming apparatus 1 includes a main body 200 and a terminal 100 that is attachable to and detachable from the main body 200.

The main body 200 includes: a housing 200a; a main-body controller 10 and an image former 20 housed in the housing 200a; a scanner 30; an auto document feeder (ADF) 40; a cradle part 50 on which the terminal 100 is placed and mounted and that is provided outside the housing 200a; a sheet receiver 60 that is exposed outside the housing 200a under the scanner 30; and a sheet feeder 70 that can be opened to the front of the housing 200a and closed.

Figure 2:
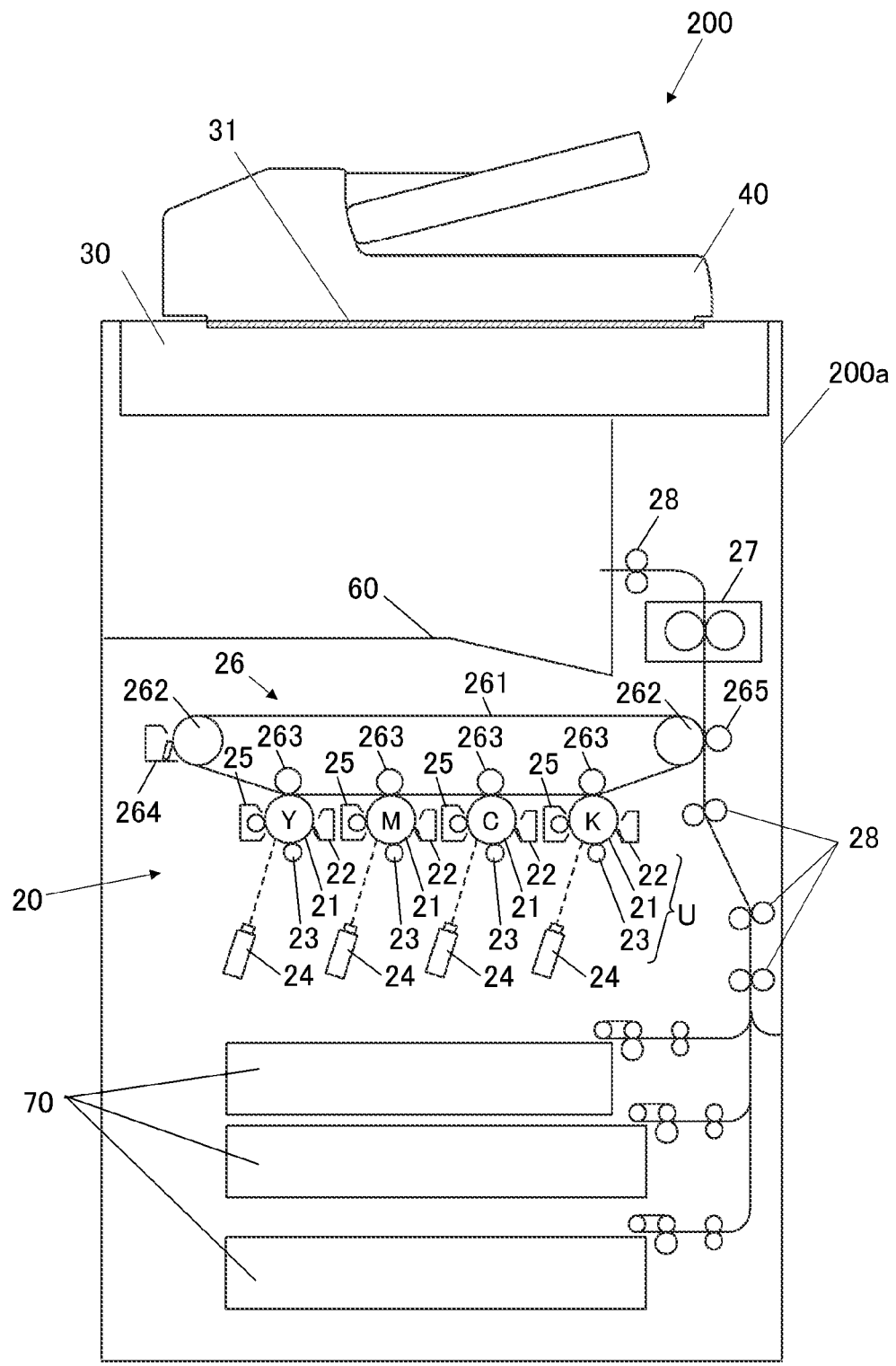
FIG. 2 is a configuration of an image former.

FIG. 2 is a configuration of the image former 20.

The image former 20 forms images on a sheet of paper fed by the sheet feeder 70 and ejects the sheet to the sheet receiver 60 under the control of the main-body controller 10.

The image former 20 includes: image carriers 21 each of which is a drum-type photoconductor that carries an electrostatic latent image(s) on its surface; cleaners 22 each of which removes residual toner on the surface of the corresponding image carrier 21; charging rollers 23 each of which uniformly charges the surface of the corresponding image carrier 21; exposing units 24 each of which forms the electrostatic latent image by exposing the surface of the charged corresponding image carrier 21; developing units 25 each of which develops the electrostatic latent image and forms a toner image on the surface of the corresponding image carrier 21 by using a developer containing toner; a transfer unit 26 that transfers the formed toner images onto an intermediate transfer belt 261 in the transferring region as the first transfer and that transfers the YMCK toner image on the intermediate transfer belt 261 onto a sheet as the second transfer; a fixing unit 27 that fixes the YMCK toner image to the sheet; and conveying rollers 28 that convey the sheet on a conveying path from the sheet feeder 70 to the sheet receiver 60. Among the above components, the image carrier 21, the cleaner 22, the charging roller 23, the exposing unit 24, and the developing unit 25 constitutes an imaging unit.

The image former 20 has four imaging units for colors of yellow (Y), magenta (M), cyan (C), and black (K). The imaging units are arranged in the order of Y, M, C, and K along the bottom plane surface of the intermediate transfer belt 261. In each of the imaging units, the cleaner 22, the charging roller 23, the exposing unit 24, and the developing unit 25 are arranged in this order along the outer circumferential surface of the image carrier 21.

The image carrier 21 rotates on an axis. The image carrier 21 has a photosensitive layer on its outer circumferential surface.

The cleaner 22 has a plate-shaped cleaning blade formed of an elastic material. The cleaner 22 causes the cleaning blade to abut the surface of the image carrier 21, so that foreign substances on the surface of the image carrier 21, such as residual toner that has not been transferred to the intermediate transfer belt 261, are removed.

The charging roller 23 is a cylindrical member. The charging roller 23 abuts the surface of the image carrier 21 and rotates on an axis in accordance with the rotation of the image carrier 21. The charging roller 23 receives charge-driving voltage from a not-shown power source to uniformly charge the surface of the image carrier 21.

The exposing unit 24 includes a laser diode (LD) as a light-emitting element. The exposing unit 24 irradiates, with laser light, the surface of the image carrier 21 charged by the charging roller 23 to form an electrostatic latent image on the image carrier 21.

The developing unit 25 includes a developing sleeve (developing roller) that faces the surface of the image carrier 21. The developing unit 25 supplies a developer containing toner, which is supplied from a not-shown toner bottle, to the surface of the developing sleeve that has a certain developing-bias potential, so that the toner in the developer on the surface of the developing sleeve is adhered to the electrostatic latent image on the surface of the image carrier 21. The developing unit 25 thus forms a toner image on the surface of the image carrier 21.

The transfer unit 26 includes: two belt-conveying rollers 262; four first transfer rollers 263 positioned so as to face the respective image carriers 21; the intermediate transfer belt 261 stretched around the belt-conveying rollers 262 and the first transfer rollers 263; a belt cleaner 264 that removes residual toner on the intermediate transfer belt 261; and a second transfer roller 265 that is pressed against one of the belt-conveying rollers 262 and that is driven to rotate as the belt-conveying roller 262 rotates.

The transfer unit 26 transfers toner on the surface of the rotating image carriers 21 onto the intermediate transfer belt 261 by rotally moving the intermediate transfer belt 261 while applying, to the first transfer rollers 263, bias voltage having a polarity reverse to the polarity of the toner. After transferring the Y, M, C, and K toner images such that the toner images are superposed on one another on the intermediate transfer belt 261, the transfer unit 26 transfers the YMCK color toner image from the intermediate transfer belt 261 onto the sheet that passes through between the intermediate transfer belt 261 and the second transfer roller 265 to which predetermined bias voltage is applied. The residual toner on the intermediate transfer belt 261 that has not been transferred onto the sheet is removed by the cleaning blade of the belt cleaner 264.

The fixing unit 27 heats and pressurizes the sheet on which the YMCK toner image has been transferred to fix the toner image to the sheet. The fixing unit 27 includes a pair of rollers constituted of a heating roller and a pressurizing roller to hold the sheet. The sheet to which the toner image has been fixed is conveyed by the conveying rollers 28 to the sheet receiver 60.

The scanner 30 includes; a platen glass 31 that has a placing surface on which a sheet is placed; an optical system that includes, for example, a light source and a reflective mirror to irradiate the sheet on the platen glass 31; and an imaging element that detects the light emitted by the optical system and reflected by the sheet. The scanner 30 reads an image on the sheet placed on the platen glass 31, generates bitmapped image data for the respective colors of red (R), green (G), and blue (B), and stores the data in the storage 13 shown in FIG. 6 under the control of the main-body controller 10.

The ADF 40 is provided above the scanner 30. The ADF 40 includes a conveying mechanism that conveys manually-fed sheets one by one so that the scanner 30 scans the sheets. The ADF 40 is movable by the user within its movable range between the state of covering the platen glass 31 and the state of exposing the platen glass 31.

The cradle part 50 shown in FIG. 1 is a cradle on which the terminal 100 is placed and mounted. The cradle part 50 has a placing surface 51 that supports the back of the terminal 100 and a supporter 52 that supports the bottom edge surface of the terminal 100. The supporter 52 is provided with a connecting terminal for exchanging signals with the terminal 100 and for supplying power to the terminal 100. When the terminal 100 is placed and mounted on the supporter 52, the connecting terminal of the terminal 100 is electrically connected to the connecting terminal of the supporter 52.

The sheet receiver 60 is provided under the scanner 30 and exposed to the outside of the housing 200a. The sheets on which images have been formed by the image former 20 are ejected to the sheet receiver 60 such that the user can take the sheets.

The sheet feeder 70 can be opened by being pulled towards the front of the housing 200a and can be closed. The sheet feeder 70 stores sheets on which images are to be formed.

The terminal 100 is a portable operation terminal for operating the main body 200. The terminal 100 includes a controller 110 shown in FIG. 5 (hardware processor, computer) that is separate from the main-body controller 10 of the main body 200 and that controls the operation of the terminal 100. The terminal 100 functions as the operation display unit 140 of the main body 200 both in the placed state of being placed on the cradle part 50 of the main body 200 and in the held state of being detached from the cradle part 50 and held by the user. In the placed state on the cradle part 50, the terminal 100 operates with power supplied via the connecting terminal of the supporter 52. When detached from the cradle part 50, the terminal 100 operates with power of the built-in battery.

The terminal 100 includes the operation display unit 140 (display) that has a touchscreen. The terminal 100 displays, on the operation display unit 140, an operation window for receiving input operations for operating the main body 200, a status window for showing the status of the main body 200, and so forth. The operation window shows, for example, operation buttons on which touching operations are performed via the touchscreen. When the touchscreen detects a touch operation within a range of any of the operation buttons shown on the operation display unit 140, the controller 110 determines that an input operation of selecting the operation button is performed and sends, to the main body 200, a control signal to cause the main body 200 to perform a process associated with the operation button. When the terminal 100 is placed on the cradle part 50, the control signal is sent via the connecting terminal of the supporter 52. When the terminal 100 is detached from the cradle part 50, the control signal is sent over a wireless communication, such as Bluetooth (registered trademark).

Figure 3:
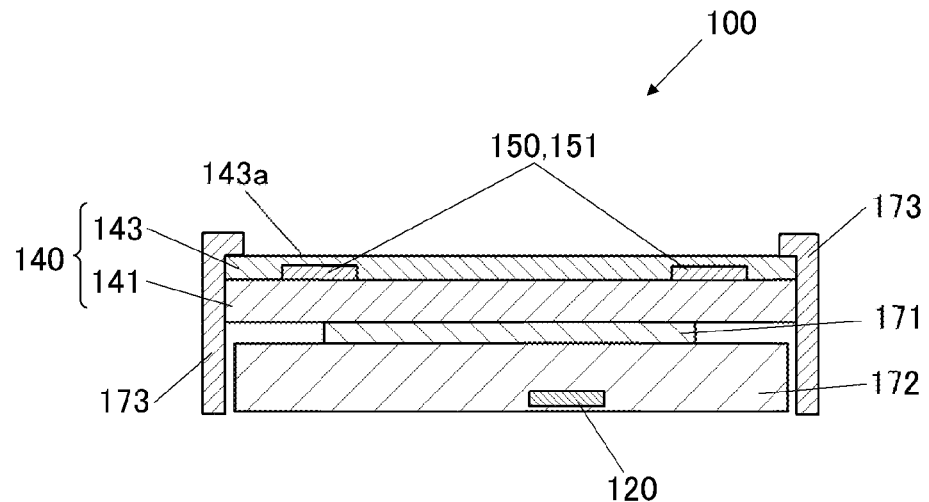
FIG. 3 is a sectional view of a configuration of a terminal.

FIG. 3 is the sectional view of the configuration of the terminal 100.

The terminal 100 includes the operation display unit 140; an operation surface vibrator 150 (vibrator, first vibrator); an inertial sensor 120; a vibration absorber 171; a back casing 172; and a lateral casing 173.

The operation display unit 140 includes a display panel 141 and a touchscreen 143.

The display panel 141 may be, for example, a liquid crystal display but is not limited thereto. The display panel 141 may be other types of display, such as an organic electroluminescent display. The display panel 141 is driven by a display-screen driver 142 in FIG. 5 to display the operation window, the status window, and so forth under the control of the controller 110.

The touchscreen 143 is superimposed on and combined with the display panel 141. The touchscreen 143 has an operation surface 143a that is laid on the display region of the display panel 141. The touchscreen 143 detects a touch of an operating tool (e.g., the user's finger or a stylus) on the operation surface 143a and the touched position. In this embodiment, the touchscreen 143 detects the position touched by the operating tool on the basis of change in capacitance of the touchscreen 143.

Figure 4:
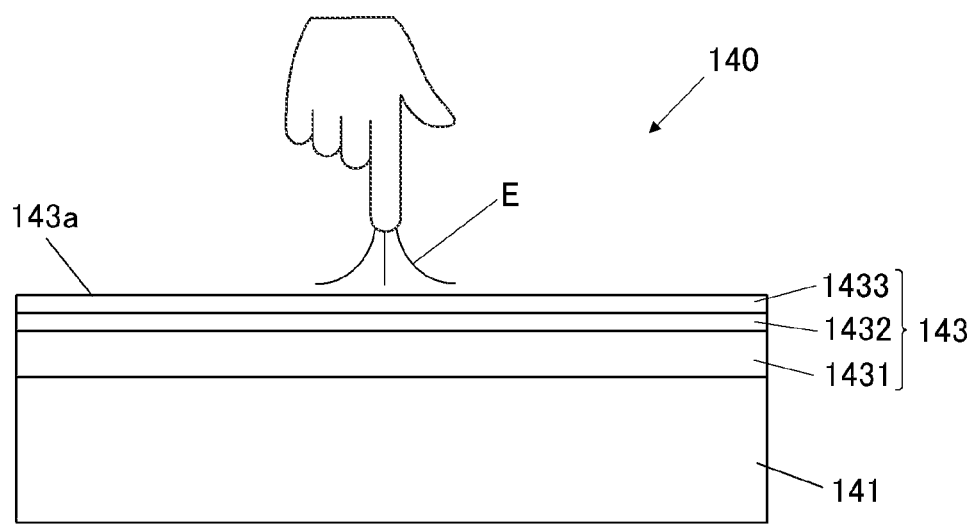
FIG. 4 is a sectional view of a detailed configuration of an operation display unit.

FIG. 4 is a sectional view of a detailed configuration of the operation display unit 140.

The touchscreen 143 includes: a glass substrate 1431 placed on the display panel 141; an electrode pattern layer 1432 placed on the glass substrate 1431; and a protective cover 1433 placed on the electrode pattern layer 1432. The surface of the protective cover 1433 constitutes the operation surface 143a.

The electrode pattern cover 1432 has the first layer, the second layer, and the insulative layer. In the first layer, first electrode wirings are arranged so as to extend in a first direction. In the second layer, second electrode wirings are arranged so as to extend in a second direction orthogonal to the first direction. The insulative layer is provided between the first and second layers. The first electrode wirings have transparent rectangular electrodes that are connected in the first direction, and the second electrode wirings have transparent rectangular electrodes that are connected in the second direction, for example.

When a finger approaches the operation surface 143a, the finger and part of the electrodes are capacitively coupled and generate an electric field E. According to the intensity of the electric field E, the capacitance between the electrodes changes. According to the change in capacitance, current flows through part of the first electrodes and part of the second electrodes. By calculating the ratio of current flowing through part of the first and second electrodes, the position (coordinate in the display region) touched with the finger can be identified.

Referring back to FIG. 3, the operation-surface vibrator 150 has vibration elements 151 that convert electric signals into physical vibration. Each of the vibration elements 151 is placed on the touchscreen 143-side surface of the display panel 141 so as not to overlap the display region of the display panel 141. In FIG. 3, one vibration element 151 is placed at each side of the display region of the display panel 141 as an example. The number and the position of vibration elements 151 are not limited to these shown in FIG. 3. For example, the vibration elements 151 may be placed on the side opposite the touchscreen 143 of the display panel 141 (back surface of the display panel 141).

Figure 5:
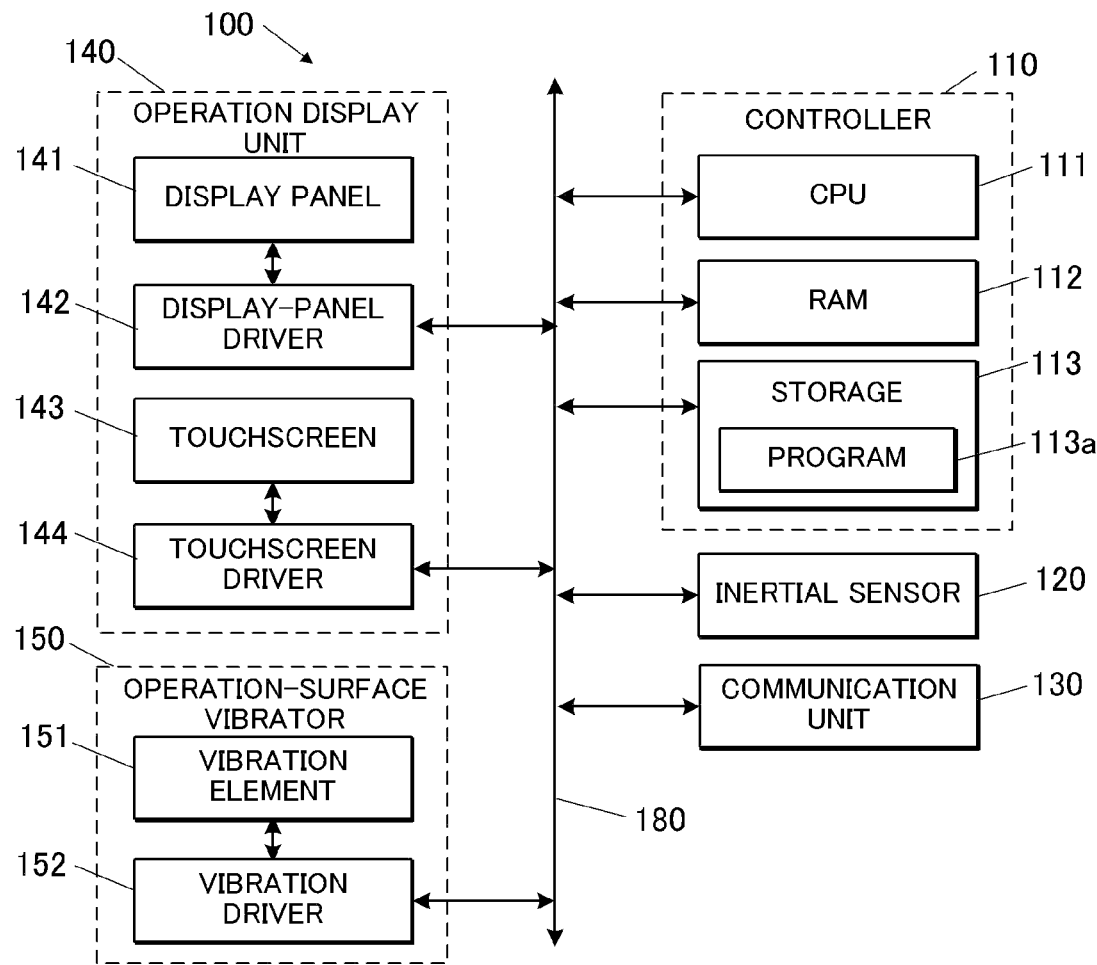
FIG. 5 is a block diagram showing main functional components of the terminal.

The vibration elements 151 are vibrated by the vibration driver 152 shown in FIG. 5 under the control of the controller 110. The vibration of the vibration elements 151 is transmitted to the operation surface 143a via the touchscreen 143. When the use's finger (operating tool) touches the operation surface 143a that is receiving the vibration, the user feels the vibration as the vibration response from the operation display unit 140. The operation-surface vibrator 150 including the vibration elements 151 thus performs the vibration action of vibrating the operation surface 143a of the touchscreen 143.

The inertial sensor 120 includes: an acceleration sensor that detects the acceleration of the terminal 100; and a gyro sensor that detects the angular velocity of the rotation of the terminal 100. The inertial sensor 120 outputs the result of detecting the acceleration and the angular velocity to the controller 110. On the basis of the detection result, the controller 110 determines whether the terminal 100 is placed on a stationary place (for example, the cradle part 50) or is held and operated in the hand of the user.

The vibration absorber 171 is placed between the back surface of the display panel 141 of the operation display unit 140 and the back casing 172. The vibration absorber 171 is a damper that absorbs the vibration of the display panel 141 that is generated by the vibration action of the operation-surface vibrator 150. The vibration transmitting path from the back surface of the display panel 141 to the back casing 172 is set so as to pass through the vibration absorber 171. This allows the vibration absorber 171 to efficiently prevent the vibration of the display panel 141 from being transmitted to the back casing 172. Thus, when the terminal 100 is placed on an object, the vibration absorber 171 absorbs the vibration transmitted from the operation-surface vibrator 150 towards the place via the back casing 172. The vibration absorber 171 may not completely absorb the vibration transmitted from the operation-surface vibrator 150 towards the place but may absorb at least part of the vibration. The material of the vibration absorber 171 is not limited to a specific material but may be an elastic resin, for example.

The back casing 172 is a box-shaped member that houses the controller 110, the inertial sensor 120, the display-panel driver 142, the touchscreen driver 144, and circuit elements constituting the vibration driver 152. The internal configuration of the back casing 172 is not shown in FIG. 3.

The lateral casing 173 is a plate-shaped member that covers the lateral sides of the display panel 141, the touchscreen 143, and the back casing 172. The lateral sides of the display panel 141 and the touchscreen 143 are fixed to the lateral casing 173. The lateral casing 173 has an opening part for exposing the operation surface 143a of the touchscreen 143 to the outside. Through the opening part, the user can perform the touch operation on the exposed operation surface 143a. The lateral casing 173 also receives the vibration of the vibration elements 151 of the operation-surface vibrator 150 via the display panel 141 and the touchscreen 143. Therefore, when the user detaches the terminal 100 from the cradle part 50 and holds it in his/her hand, the user can feel the vibration of the vibration elements 151 via the lateral casing 173 as well as via the operation surface 143a. In FIG. 3, space is present between the lateral casing 173 and the back casing 172. The space may be filled with the vibration absorber 171.

FIG. 5 is a block diagram showing main functional components of the terminal 100.

The terminal 100 includes the controller 110, the inertial sensor 120, the communication unit 130, the operation display unit 140, the operation-surface vibrator 150, and a bus 180. The operation display unit 140 includes the display panel 141, the display-panel driver 142, the touchscreen 143, and the touchscreen driver 144. The operation-surface vibrator 150 includes the vibration elements 151 and the vibration driver 152. The components of the terminal 100 are connected via the bus 180. The components that have already been described are not described below.

The controller 110 includes a central processing unit (CPU) 111, a random access memory (RAM) 112, and a storage 113. The CPU 111 of the controller 110 executes the programs 113a stored in the storage 113 to perform various processes, so that the controller 110 functions as a vibration control unit, a state determination unit, a touch-operation prediction unit, and a touch-operation detection unit.

The CPU 111 reads and executes the programs 113a stored in the storage 113 to perform various arithmetic processes.

The RAM 112 provides a working memory space for the CPU 111 and stores temporal data.

The storage 113 consists of a nonvolatile storage, such as a hard disk drive (HDD), a solid state drive (SSD), and/or a flash memory. The storage 113 stores the programs 113a to be performed by the CPU 111 and various kinds of data.

The controller 110, which includes the CPU 111, the RAM 112, and the storage 113, centrally controls the components of the terminal 100 in accordance with the programs 113a.

For example, the controller 110 sends a control signal to the display-panel driver 142 to cause the display panel 141 to display the operation window and the status window.

Further, the controller 110 sends a control signal to the touchscreen driver 144 and receives a detection signal from the touchscreen driver 144 to detect the touch on the operation surface 143a of the touchscreen 143 with the operating tool and the touched position.

Further, the controller 110 sends a control signal to the vibration driver 152 to cause the vibration elements 151 to vibrate at an appropriate timing, intensity and vibration pattern.

The communication unit 130 is a communication module that includes an antenna, a modulation and demodulation circuit, and a signal processing circuit. The communication unit 130 wirelessly sends and receives data to and from the communication unit 80 of the main body 200 in accordance with a wireless communication protocol, such as Bluetooth.

Figure 6:
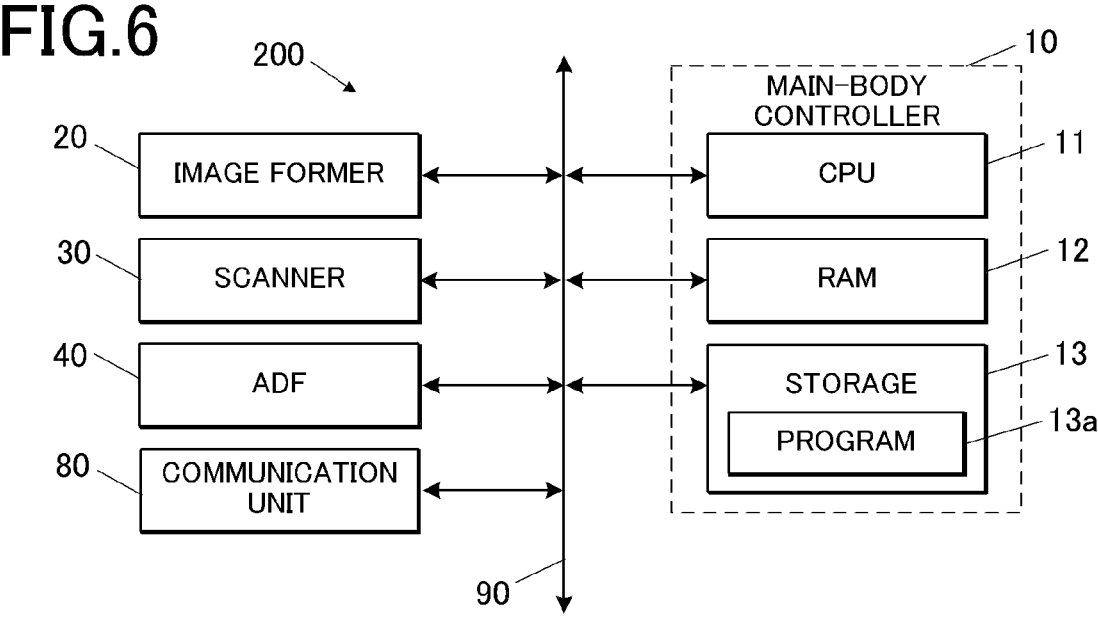
FIG. 6 is a block diagram showing main functional components of the main body of the image forming apparatus.

FIG. 6 is a block diagram showing main functional components of the main body 200.

The main body 200 includes the main-body controller 10, the image former 20, the scanner 30, the ADF 40, the communication unit 80, and a bus 90. The components of the main body 200 are connected via the bus 90. The components that have already been described are not described below.

The main-body controller 10 includes a CPU 11, a RAM 12, and a storage 13.

The CPU 11 reads and executes programs 13a stored in the storage 13 to perform various arithmetic processes.

The RAM 12 provides a working memory space for the CPU 11 and stores temporal data.

The storage 13 consists of a nonvolatile storage, such as a HDD, a SSD, and/or a flash memory. The storage 13 stores the programs 13a to be performed by the CPU 11 and various kinds of data. The kinds of data to be stored in the storage 13 include image data obtained by the scanner 30 and image data input from outside via the communication unit 80.

The controller 10, which includes the CPU 11, the RAM 12, and the storage 13, centrally controls the components of the main body 200 in accordance with the programs 13a. For example, the controller 10 causes the components of the main body 200 to perform the operation corresponding to an input operation received by the terminal 100 in accordance with a control signal sent from the terminal 100 and received via the communication unit 80.

The communication unit 80 consists of a network card, a communication module, and/or the like. The communication unit 80 is connected to a communication network, such as a local area network (LAN) to send and receive data to and from external apparatuses over the network. The communication unit 80 wirelessly sends and receives data to and from the communication unit 130 of the terminal 100 in accordance with the wireless communication protocol, such as Bluetooth.

Next, the operation of the image forming apparatus 1 is described. The description is mainly on the reception of an input operation with the terminal 100.

The operation display unit 140 of the terminal 100 in this embodiment receives a touch operation on the operation surface 143a of the touchscreen 143 by the user as an input operation. The operation display unit 140 converts the input operation into an operation signal and outputs the operation signal to the controller 110. The operation display unit 140 also sends a notification to the user in response to the received input operation by causing the operation-surface vibrator 150 to perform a vibration action (vibration response). More specifically, in response to the touch operation on the operation surface 143a being detected, the operation-surface vibrator 150 vibrates the vibration elements 151. The vibration of the vibration elements 151 vibrates the operation surface 143a and the lateral casing 173. The vibration of the operation surface 143a and the lateral casing 173 is received by the user as the vibration response.

When the touch operation is performed on the terminal 100 placed on an object (placed state), the vibration of the operation surface 143a is transmitted to the finger of the user touching the operation surface 143a. The placed state may be a state in which the terminal 100 is placed on the cradle part 50 of the main body 200 or may be a state in which the terminal 100 is detached from the cradle part 50 and placed on a stationary place, such as a table. The object may not be stationary and may be, for example, a table set inside a moving vehicle. Examples of the object, however, do not include parts of the user's body (e.g., hand).

When the terminal 100 is in a state other than the placed state, namely in the non-placed state, the terminal 100 is operated in the hand of the user. The state of the terminal 100 other than the placed state is therefore called the held state. When the touch operation is performed on the operation surface 143a of the terminal 100 in the held state, the hand of the user is in contact with the lateral casing 173 as well as the operation surface 143a. The user therefore receives the vibration of the lateral casing 173 with his/her finger as well as the vibration response with his/her finger.

The vibration response in the placed state is transmitted only to the user's finger and is therefore less perceivable than the vibration response in the held state, which is transmitted to the user's hand.

When the intensity of the vibration response is increased so that the vibration response in the placed state is more perceivable to the user's finger, the vibration may be too strong for the user's hand holding the lateral casing 173.

Vibrating the vibration elements 151 at uniform intensity therefore may not send an appropriate vibration response to the user.

To deal with the above issue, the controller 110 of the terminal 100 in this embodiment determines whether or not the terminal 100 is in the placed state, namely whether the terminal 100 is in the placed state or in the held state, and adjusts the vibration intensity of the operation-surface vibrator 150 according to the determination.

More specifically, when determining that the terminal 100 is in the placed state, the controller 110 causes the operation-surface vibrator 150 to perform the vibration action at first vibration intensity that can be felt by the finger. When determining that the terminal 100 is in the held state, the controller 110 causes the operation-surface vibrator 150 to perform the vibration action at second vibration intensity that is weaker than the first vibration intensity.

Accordingly, when the terminal 100 is in the placed state in which only the finger of the user is in contact with the terminal 100, the terminal 100 performs vibration at appropriate and sufficient intensity so that the user easily feels the vibration. On the other hand, when the terminal 100 is in the held state in which both the finger and the hand of the user are in contact with the terminal 100, the terminal 100 performs vibration at reduced intensity so as to avoid problems caused by too strong vibration and reduce power consumption by vibration.

Figure 7:
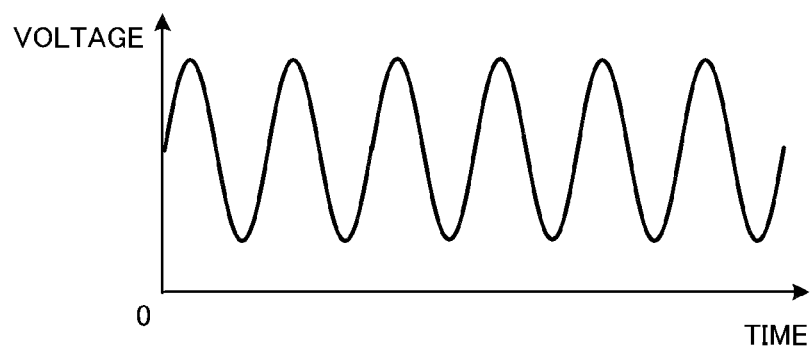
FIG. 7 shows a first driving waveform to be applied to a vibration element when the terminal is in a placed state.

FIG. 7 shows the voltage waveform (first driving waveform) of the driving signal to be applied to the vibration elements 151 when the terminal 100 in the placed state performs the vibration action at the first vibration intensity.

Figure 8:
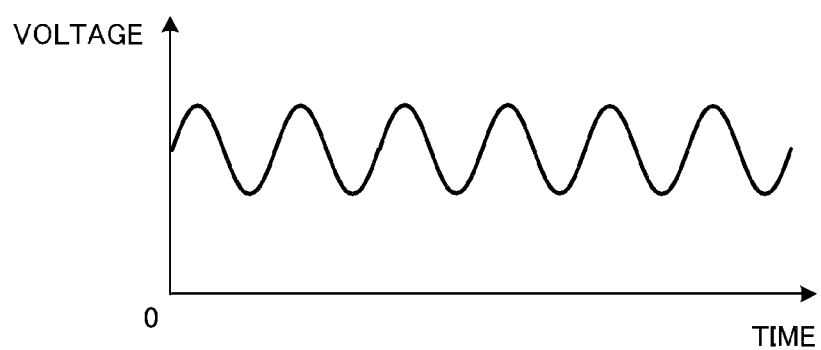
FIG. 8 shows a second driving waveform to be applied to the vibration element when the terminal is in a held state.

FIG. 8 shows the voltage waveform (second driving waveform) of the driving signal to be applied to the vibration elements 151 when the terminal 100 in the held state performs the vibration action at the second vibration intensity.

The first and second driving waveforms are both sine waves having the same frequency. The amplitude of the first driving waveform is greater than the amplitude of the second driving waveform with respect to the reference voltage. The maximum voltage to be applied with the first driving waveform is therefore greater than the maximum voltage to be applied with the second driving waveform. As the vibration intensity of the vibration elements 151 corresponds to the voltage of the applied driving waveform, the first vibration intensity driven with the first driving waveform in FIG. 7 is greater than the second vibration intensity driven with the second driving waveform in FIG. 8.

Next, the vibration response process of the terminal 100 for performing the vibration response is described.

Figure 9:
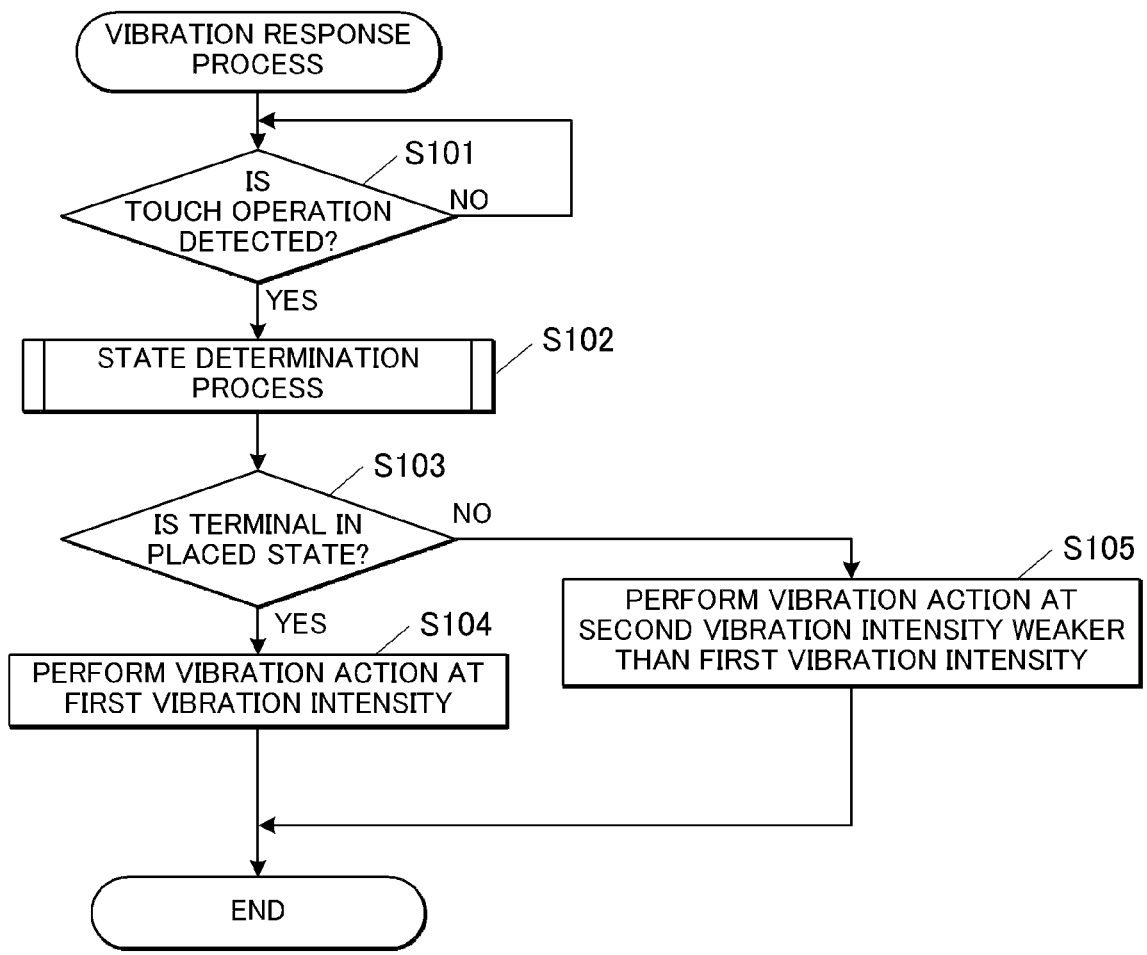
FIG. 9 is a flowchart showing control steps of a vibration response process in the first embodiment.

FIG. 9 is a flowchart showing control steps of the vibration response process to be performed by the controller 110 in the first embodiment.

The vibration response process starts when the operation display unit 140 displays the operation window on the display panel 141.

When the vibration response process starts, the controller 110 determines whether or not a touch operation on the operation surface of the touchscreen 143 is detected on the basis of the detection signal from the touchscreen driver 144 (Step S101). When determining that a touch operation is not detected (Step S101: NO), the controller 110 repeats Step S101.

When determining that a touch operation is detected (Step S101: YES), the controller 110 performs the state determination process to determine whether or not the terminal 100 is in the placed state (Step S102).

Figure 10:
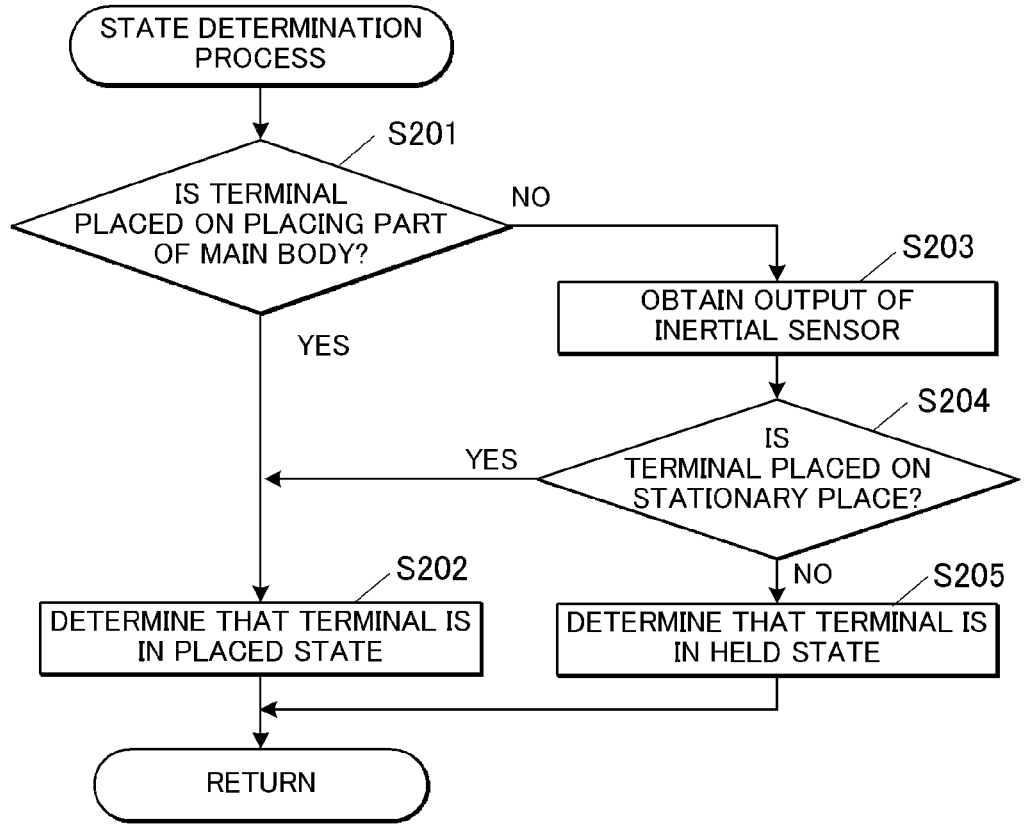
FIG. 10 is a flowchart showing control steps of a state determination process.

FIG. 10 is a flowchart showing control steps of the state determination process by the controller 110.

When the state determination process is called, the controller 110 determines whether or not the terminal 100 is placed on the cradle part 50 of the main body 200 (Step S201). Herein, the controller 110 determines that the terminal 100 is placed on the cradle part 50 when the terminal 100 is receiving power from the main body 200 via the connection terminal of the cradle part 50. When determining that the terminal 100 is placed on the cradle part 50 (Step S201: YES), the controller 110 determines that the terminal 100 is in the placed state (Step S202).

When determining that the terminal 100 is not placed on the cradle part 50 (Step S201: NO), the controller 110 obtains an output signal from the inertial sensor 120 (Step S203). On the basis of the output signal, the controller 110 determines whether or not the terminal 100 is placed on a stationary place (i.e., placed at rest) (Step S204). Herein, the controller 110 determines that the terminal 100 is placed on a stationary place when the acceleration and/or the angular velocity detected by the inertial sensor 120 meet certain conditions. The conditions may be, for example, that the maximum value of the acceleration and/or the angular velocity during a certain period is smaller than a predetermined reference value. The reference value in the conditions is determined within the range of values smaller than the minimum value of the acceleration and/or the angular velocity that can be detected during a certain period when the terminal 100 is held and operated in the hand.

When determining that the terminal 100 is placed on a stationary place (Step S204: YES), the controller 110 determines that the terminal 100 is in the placed state (Step S202). When determining that the terminal 100 is not placed on a stationary place (Step S204: NO), the controller 110 determines that the terminal 100 is in the held state (Step S205).

After Step S202 or S205, the controller 110 ends the state determination process and returns to the vibration response process.

After ending the vibration response process in FIG. 9 (Step S102), when determining that the terminal 100 is in the placed state (Step S103: YES), the controller 110 sends a control signal to the vibration driver 152 to perform the vibration action at the first vibration intensity (Step S104). When determining that the terminal 100 is not in the placed state but in the held state (Step S103: NO), the controller 110 sends a control signal to the vibration driver 152 to perform the vibration action at the second vibration intensity that is weaker than the first vibration intensity (Step S105).

After Step S104 or S105, the controller 110 ends the vibration response process.

In the above description, the controller 110 determines whether or not the terminal 100 is in the placed state by determining (i) whether or not the terminal 100 is placed on the cradle part 50 of the main body 200 and (ii) whether or not the terminal 100 is placed at rest on the basis of the output signal of the inertial sensor 120. This is an example and not limitation.

For example, the controller 110 may determine whether or not the terminal 100 is in the placed state only by determining whether or not the terminal 100 is placed on the cradle part 50. In the case, Steps S203 and S204 in FIG. 10 may be omitted.

As another example, the controller 110 may determine whether or not the terminal 100 is in the placed state only by determining whether or not the terminal 100 is placed at rest on the basis of the output signal of the inertial sensor 120. In the case, the controller 110 may first perform Step S203 in the state determination process in FIG. 10 without performing Step S201.

As described above, the terminal 100 in the first embodiment is a portable terminal for controlling the main body 200. The terminal 100 includes: the operation display unit 140 with the touchscreen 143; the operation-surface vibrator 150 that is configured to perform a vibration action of vibrating at least the operation surface 143a of the touchscreen 143; and the controller 110. The controller 110 as the state determination unit determines whether or not the terminal 100 is in a placed state of being placed on an object. The controller 110 as the vibration control unit causes the operation-surface vibrator 150 to perform the vibration action in response to a touch operation on the operation surface 143a. When the terminal 100 is in the placed state, the controller 110 causes the operation-surface vibrator 150 to perform the vibration action at first vibration intensity. When the terminal 100 is not in the placed state, the controller 110 causes the operation-surface vibrator 150 to perform the vibration action at second vibration intensity that is lower than the first vibration intensity.

According to this configuration, the terminal 100 in the placed state can perform the vibration response at appropriate intensity that can be felt with the finger on the operation surface 143a. When in the held state in which the user's finger and hand are in contact with the terminal 100, the terminal 100 can perform the vibration response at the second vibration intensity weaker than the first vibration intensity. The terminal 100 thus can avoid annoying the user with too strong vibration and reduce power consumption by vibration.

Further, the terminal 100 includes the vibration absorber 171 that absorbs vibration propagating from the operation-surface vibrator 150 towards the object on which the terminal 100 is placed. According to this configuration, the terminal 100 placed on the cradle part 50 can prevent vibration of the operation-surface vibrator 150 from being transmitted to the main body 200. The terminal 100 thus can avoid affecting the operation of the main body 200 with the vibration of the operation-surface vibrator 150, while adjusting the vibration intensity of the operation-surface driver 150 such that the user can easily feel the vibration. More specifically, the terminal 100 can avoid decreasing the quality of image data formed by the image former 20 or generated by the scanner 30, while increasing the vibration intensity in the placed state.

Further, the controller 110 determines that the terminal 100 is in the placed state when the terminal 100 is placed on the cradle part 50. According to this configuration, the terminal 100 placed on the cradle part 50 can perform the vibration response at sufficient intensity so that the user feels the vibration with his/her finger touching the operation surface 143a.

Further, the controller 110 as the state determination unit determines that the terminal 100 is in the placed state in response to the terminal 100 receiving power from the main body 200. According to this configuration, the controller 110 can easily and properly determine whether or not the terminal 100 is placed on the cradle part 50.

Further, the terminal 100 includes the inertial sensor 120, and the controller 110 as the state determination unit determines whether or not the terminal 100 is in the placed state based on an output of the inertial sensor 120. According to this configuration, the terminal 100 placed on an object other than the cradle part 50 of the main body 200, such as a table, can perform the vibration response the same way as the vibration response when placed on the cradle part 50. When the terminal 100 is placed on an object other than the cradle part 50, the user is not holding the terminal 100 but touching the terminal 10 only with his/her finger operating the operation surface 143a. The terminal 100 placed on the object other than the cradle part 50 performs the vibration action the same way as when placed on the cradle part 50. The terminal 100 thus can perform the vibration response at sufficient intensity so that the user can feel the vibration with the finger touching the operation surface 143a.

Further, the program 113a in the first embodiment causes the controller 110 (computer) of the terminal 100 to function as a hardware processor that: determines whether or not the terminal 100 is in a placed state of being placed on an object; and causes the operation-surface vibrator 150 to perform the vibration action in response to a touch operation on the operation surface 143a, wherein when the terminal 100 is in the placed state, the hardware processor causes the operation-surface vibrator 150 to perform the vibration action at first vibration intensity, and when the terminal 100 is not in the placed state, the hardware processor causes the operation-surface vibrator 150 to perform the vibration action at second vibration intensity that is lower than the first vibration intensity.

According to such a program, the terminal 100 in the placed state can perform the vibration response at sufficient intensity so that the user can feel the vibration with his/her finger on the operation surface 143a. Further, according to the program, the terminal 100 in the held state can avoid annoying the user with too strong vibration and can reduce power consumption by vibration.

Second Embodiment

Next, a second embodiment is described. The second embodiment is different from the first embodiment in that the terminal 100 predicts a touch operation and performs the vibration action according to the prediction. Hereinafter, aspects of the second embodiment that are different from the first embodiment are described.

When the terminal 100 is in the placed state, the terminal 100 has to start the vibration response before the user leaves his/her finger from the operation surface 143a, or the user can not feel the vibration. A touch time during which the user's finger is in contact with the operation surface 143a differs from user to user. For a user with a short touch time, the terminal 100 may not start the vibration response before the touch time ends.

In this second embodiment, the terminal 100 predicts a touch operation by detecting approach of the finger to the operation surface 143a. In response to predicting the touch operation, the terminal 100 starts the vibration action for the vibration response before the finger touches the operation surface 143a.

With the capacitance-type touchscreen 143, capacitance coupling between the finger and the electrodes of the touchscreen 143 occurs when the finger is close to but not in touch with the operation surface 143a as well as when the finger is in contact with the operation surface 143a. The touchscreen 143 can therefore detect the approach of the finger to the operation surface 143a on the basis of changes in intensity of an electric field caused by capacitance coupling.

Figure 11:
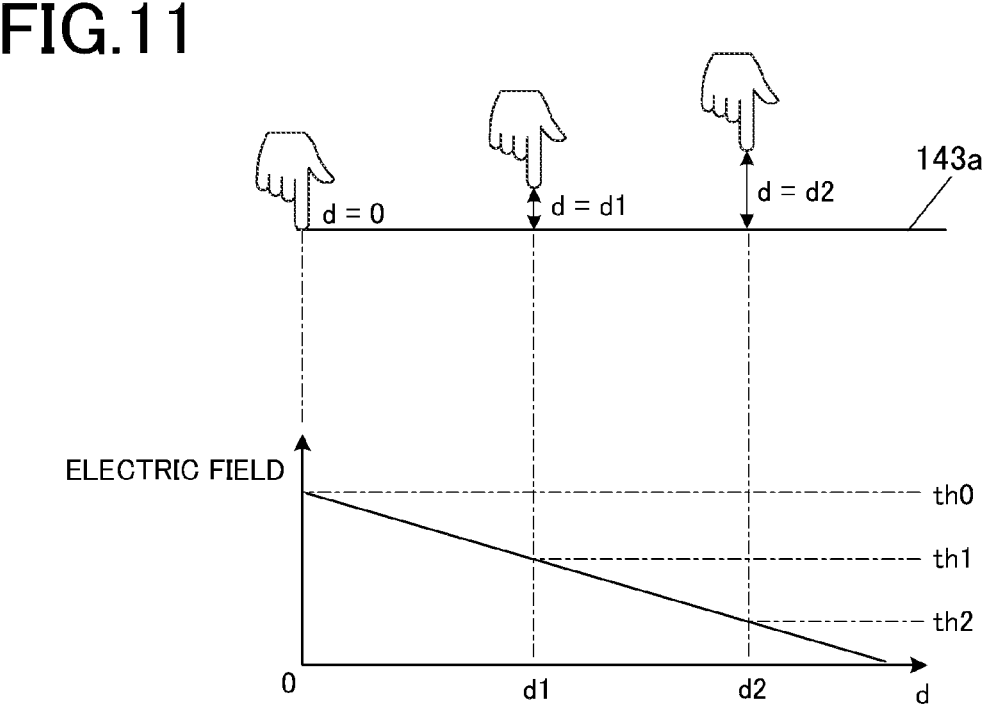
FIG. 11 is a figure to explain how a touchscreen detects the approach of a finger.

FIG. 11 is a figure to explain how the touchscreen 143 detects the approach of the finger.

In the top part of FIG. 11, three cases with different distances d between the finger and the operation surface 143a are shown. In the left case, the finger is in touch with the operation surface 143a, where d=0. In the center case, the finger is separate from the operation surface 143a by the distance d1. In the right case, the finger is separate from the operation surface 143a by the distance d2 that is greater than d1.

The graph in the bottom part of FIG. 11 shows the relation between the distance d and the intensity of the electric field E formed between the finger and the electrodes. As shown in the graph, the electric field E is strongest when the finger is in touch with the operation surface 143a, and becomes weaker as the distance d between the finger and the operation surface 143a is longer.

The approach of the finger to the operation surface 143a within the detection distance range dn can be detected by determining the threshold th of the electric field E to be detected (i.e., change in current that corresponds to electric field E). For example, when the threshold th of the electric field E is set to th1 in FIG. 6, the finger within the detection distance range d1 to the operation surface 143a can be detected.

Hereinafter, a series of steps for predicting the touch of the finger and performing the vibration action at the timing when the finger approaches the operation surface 143 within the detection distance range dn is called the predictive response process.

Figure 12:
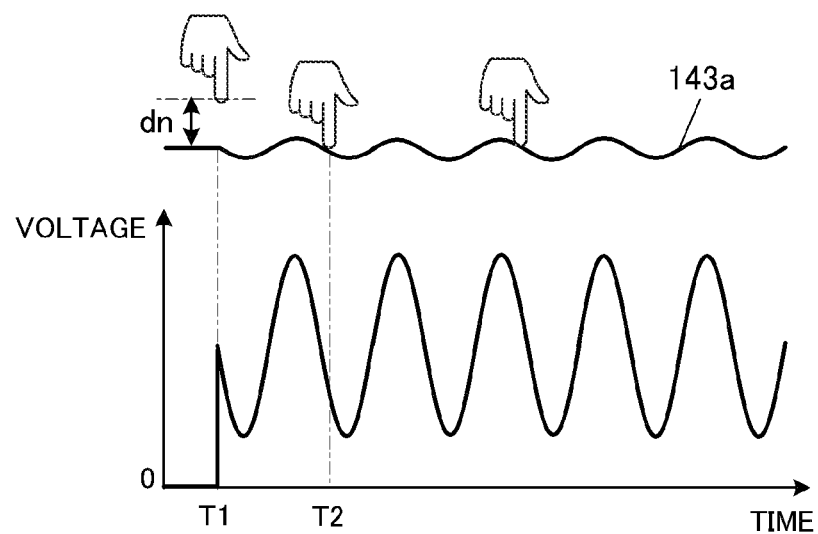
FIG. 12 shows a first driving waveform when a predictive response process is performed in a second embodiment.

FIG. 12 shows the first driving waveform in the predictive response process in the second embodiment. The first driving waveform shown in FIG. 12 is used when the terminal 100 is in the placed state.

In FIG. 12, T1 is the timing at which the finger is within the detection distance range dn to the operation surface 143a, and T2 is the timing at which the finger touches the operation surface 143a. As shown in FIG. 12, at the timing T1 at which the finger is within the detection distance range dn, the first driving waveform is applied to start the vibration action for the vibration response, so that the vibration action has already been started at the timing T2. Accordingly, the terminal 100 can send a proper vibration response to the user even in in the placed state, in which only the user's finger touches the operation surface 143a. There may be a case where the terminal 100 cannot start vibration before the finger touches the operation surface 143a owing to a time lag between detecting the approach of the finger and starting the vibration. The terminal 100 can still start vibration earlier than in the case of starting vibration after detecting the touch of the finger. The vibration is therefore more likely to be sent while the finger is in contact with the operation surface 143a.

On the other hand, the terminal 100 in the held state does not perform the predictive response process but starts the vibration action for the vibration response in response to detecting the actual touch of the finger on the operation surface 143a.

This is firstly because the user can feel the vibration with the hand holding the lateral casing 173 of the terminal 100 even if the vibration does not start while the finger is in contact with the operation surface 143a.

Secondly, if the terminal 100 in the held state performs the predictive response process, the vibration response is started and transmitted to the user's hand holding the lateral casing 173 before the user's finger touches the operation surface 143a. Such a too early vibration response may be strange to the user.

Thirdly, when the prediction is wrong, the hand holding the lateral casing 173 may receive an inappropriate vibration response. There may be a case where the touch operation is not actually performed although the terminal 100 predicts a touch operation and starts vibration. In the case, the user receives the vibration response via the lateral casing 173 even though he/she has not touched the operation surface 143a. On the other hand, when the terminal 100 is in the placed state, the user does not receive such an inappropriate vibration response because the user is not holding the lateral casing 173 in his/her hand.

Figure 13:
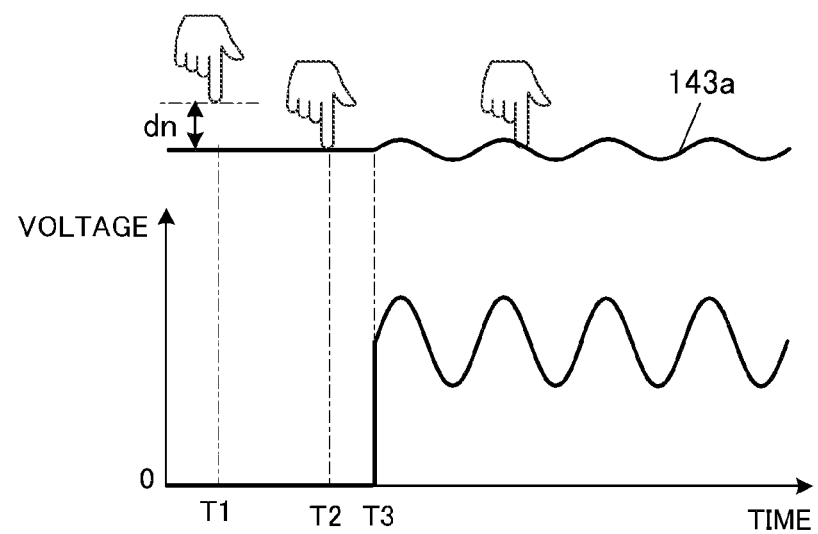
FIG. 13 shows a second driving waveform in the second embodiment.

FIG. 13 shows the second driving waveform in the second embodiment. The second driving waveform in FIG. 13 is used when the terminal 100 is in the held state.

The terminal 100 in the held state does not perform the predictive response process nor perform vibration at the timing T1 at which the finger is within the detection distance range dn. The terminal 100 starts applying the second driving waveform to start vibration action for the vibration response after detecting the touch of the finger at the timing T2 and confirming the touched position at the timing T3. In a case where the finger leaves the operation surface 143a after the timing T2 and before the timing T3 at which the vibration starts, the hand holding the lateral casing 173 receives vibration after the timing T3.

Figure 14:
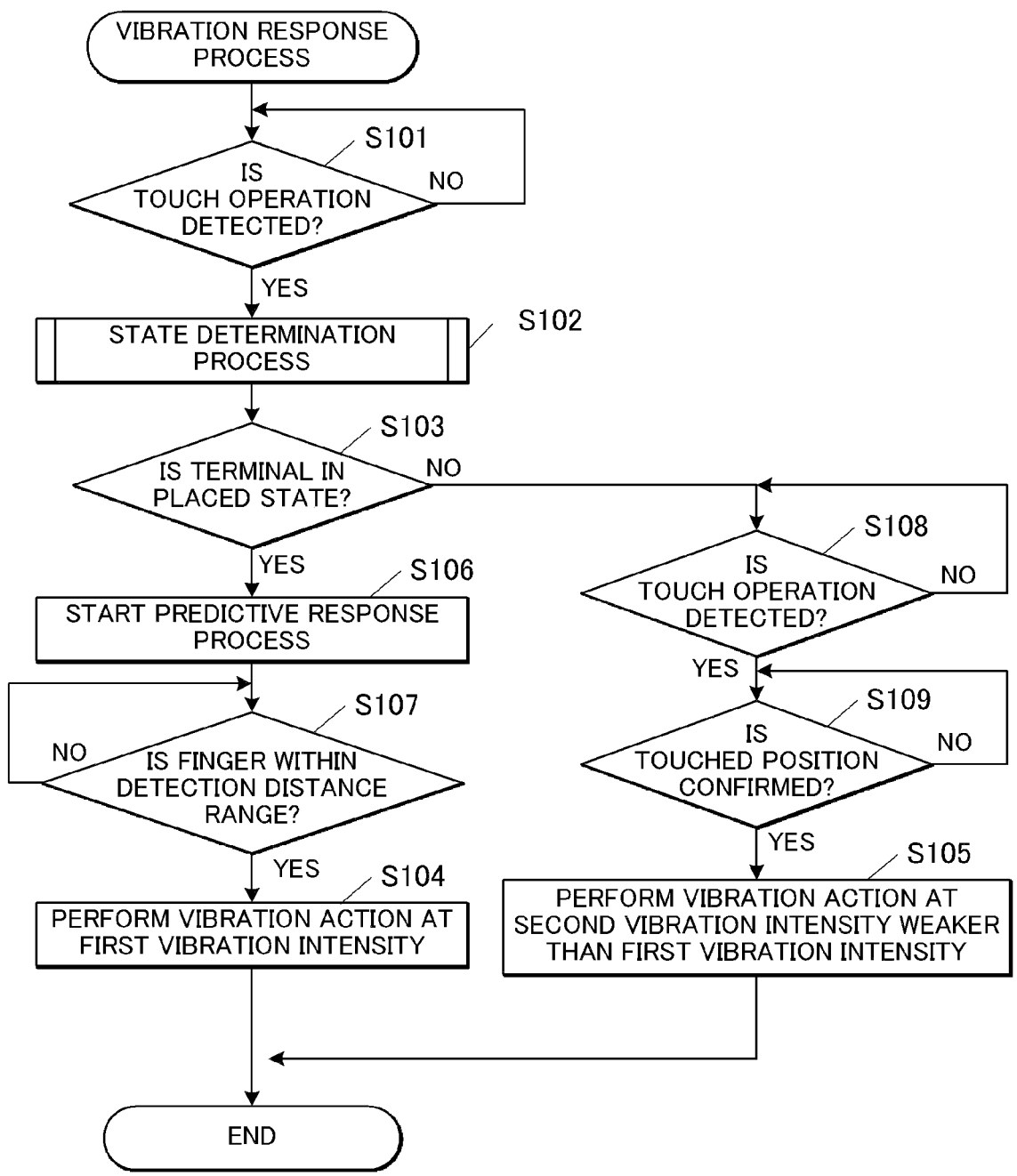
FIG. 14 is a flowchart showing control steps of the vibration response process in the second embodiment.

FIG. 14 is a flowchart showing control steps of the vibration response process to be performed by the controller 110 in the second embodiment.

The flowchart in FIG. 14 is different from the flowchart in FIG. 9 in that Steps S106 to S109 are added. Hereinafter, aspects different from the flowchart FIG. 9 are described.

After the state determination process in Step S102, when determining that the terminal 100 is in the placed state (Step S103: YES), the controller 110 starts the predictive response process (Step S106). The controller 110 determines whether or not the finger approaches the operation surface 143a within the detection distance range dn (Step S107). When determining that the finger is not within the detection distance range dn (Step S107: NO), the controller 110 repeats Step S107. When determining that the finger is within the detection distance range dn, namely predicting a touch operation (Step S107: YES), the controller 110 sends a control signal to the vibration driver 152 to perform the vibration action at the first vibration intensity (Step S104).

In Step S103, when determining that the terminal 100 is not in the placed state (i.e., the terminal 100 is in the held state) (Step S103: NO), the controller 110 performs the vibration response without performing the predictive response process. The controller 110 repeats determining whether or not a touch operation is detected until a touch operation on the operation surface 143a is detected (Step S108). When the touch operation is detected (Step S108: YES), the controller 110 performs the process of identifying the touched position until confirming the touched position (Step S109). When confirming the touched position (Step S109: YES), the controller 110 sends a control signal to the vibration driver 152 to perform the vibration action at the second vibration intensity weaker than the first vibration intensity (Step S105).

After Step S104 or S105, the controller 110 ends the vibration response process.

In the above description, the first vibration intensity in the placed state is stronger than the second vibration intensity in the held state as an example. However, the vibration intensity may not be different between in the placed state and the held state if, as a result of the predictive response process, the user can certainly feel the vibration response of the terminal 100 in the placed state.

As described above, the terminal 100 in the second embodiment is a portable terminal for controlling the main body 200. The terminal 100 includes: the operation display unit 140 with the touchscreen 143; the operation-surface vibrator 150 that is configured to perform a vibration action of vibrating at least the operation surface 143a of the touchscreen 143; and the controller 110. The controller 110 as the vibration control unit controls the vibration action of the operation-surface vibrator 150. The controller 10 as the state determination unit determines whether or not the terminal 100 is in a placed state of being placed on an object. The controller 110 as the touch-operation prediction unit makes a prediction on whether a touch operation is to be performed on the operation surface 143a by detecting the operation tool approaching the operation surface 143a within a certain distance. The controller 110 as the touch-operation detection unit detects the touch operation performed on the operation surface 143a with the operation tool. When the terminal 100 is in the placed state, the controller 110 as the vibration control unit causes the operation-surface vibrator 150 to start the vibration action in response to predicting the touch operation. When the terminal 100 is not in the placed state, the controller 110 as the vibration control unit causes the operation-surface vibrator 150 to start the vibration action in response to detecting the touch operation.

According to this configuration, the terminal 100 in the placed state can start the vibration response before the timing T2 at which the finger touches the operation surface 143a. Accordingly, the terminal 100 in the placed state, in which only the finger touches the terminal 100, can make sure to send the vibration response to the user. There may be a case where the terminal 100 cannot start vibration before the finger touches the operation surface 143a owing to a time lag between the detecting the approach of the finger and starting the vibration. The terminal 100 can still start vibration earlier than in the case of starting vibration after detecting the touch of the finger, so that the vibration is more likely to be sent to the finger while the finger is in contact with the operation surface 143a.

The terminal 100 in the held state does not perform the predictive response process but performs the vibration response when detecting the touch. The terminal 100 can therefore avoid sending an inappropriate vibration response to the hand holding the lateral casing 173 when the prediction is wrong. There may be a case where the touch operation is not actually performed although the terminal 100 predicts a touch operation and starts vibration. In the case, the terminal 100 can avoid sending the vibration response via the lateral casing 173 to the user who is not touching the operation surface 143a.

Further, the program 113a in the second embodiment causes the controller 110 (computer) of the terminal 100 to function as a hardware processor that: controls the vibration action of the operation-surface vibrator 150; determines whether or not the terminal 100 is in a placed state of being placed on an object; makes a prediction on whether a touch operation is to be performed on the operation surface 143a by detecting the operation tool approaching the operation surface 143a within a certain distance; and detects the touch operation performed on the operation surface 143a with the operation tool. When the terminal 100 is in the placed state, the hardware processor causes the operation-surface vibrator 150 to start the vibration action in response to predicting the touch operation, and when the terminal 100 is not in the placed state, the hardware processor causes the operation-surface vibrator 150 to start the vibration action in response to detecting the touch operation.

According to this program, the terminal 100 in the placed state starts the vibration response before the timing T2 at which the finger touches the operation surface 143a, so that the vibration response is certainly transmitted to the user. Further, according to this program, the terminal 100 in the held state can avoid sending an inappropriate vibration response to the user when the prediction is wrong.

Third Embodiment

Next, a third embodiment is described. The third embodiment is different from the first embodiment in that the terminal 100 further includes, in addition to the operation-surface vibrator 150, a back-surface vibrator 160 that vibrates the back surface of the terminal 100. Hereinafter, aspects of the third embodiment that are different from the first embodiment are described. The third embodiment can be combined with the second embodiment.

Figure 15:
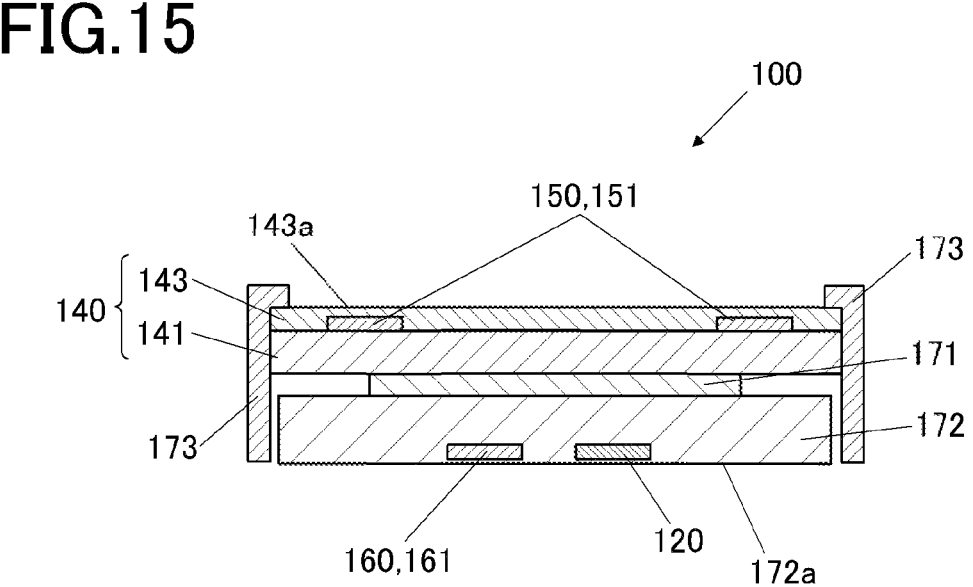
FIG. 15 is a sectional view of a configuration of the terminal in a third embodiment.

FIG. 15 is a sectional view of a configuration of the terminal 100 in the third embodiment.

Figure 16:
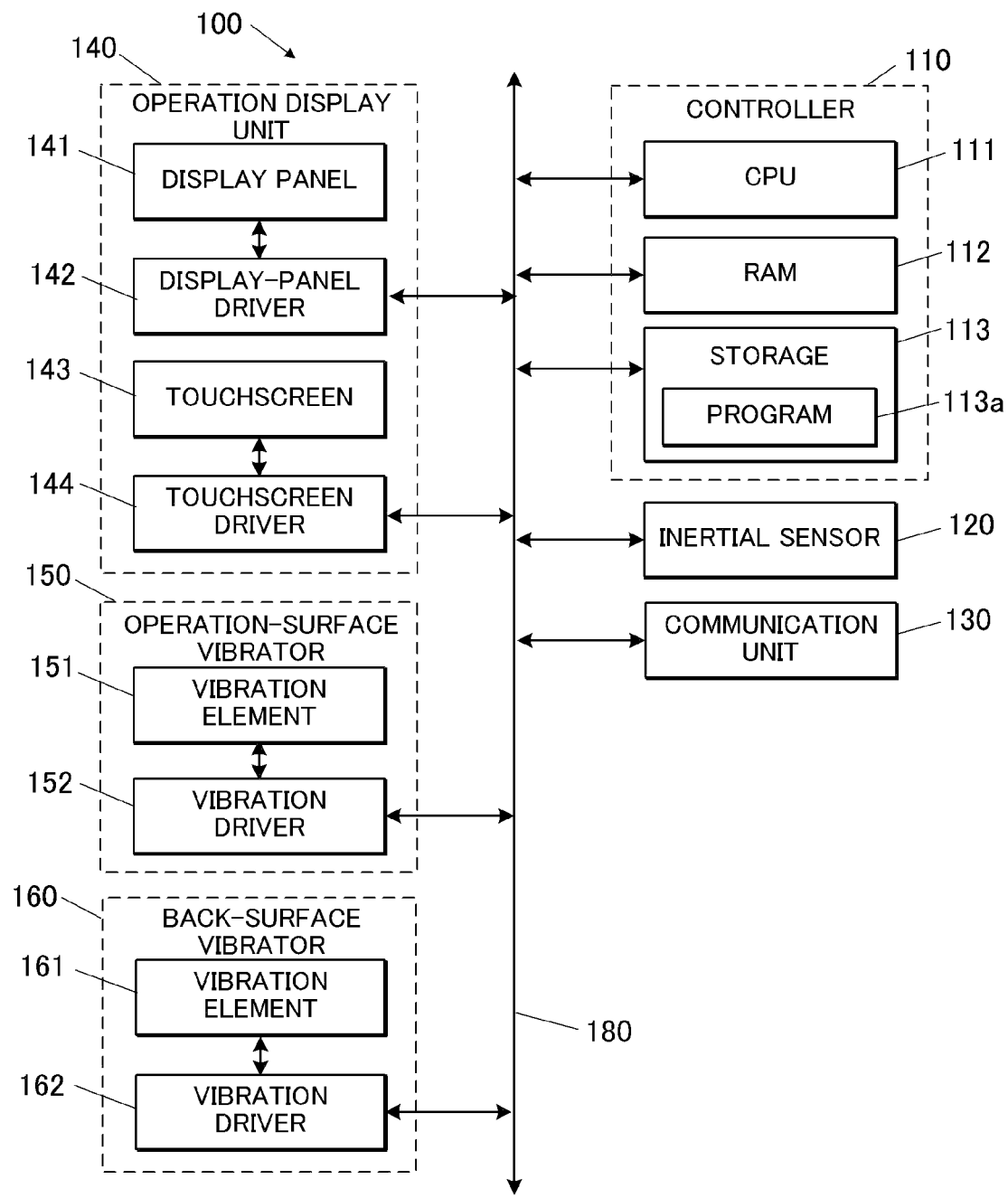
FIG. 16 is a block diagram showing main functional components of the terminal in the third embodiment.

FIG. 16 is a block diagram showing main functional components of the terminal 100 in the third embodiment.

The terminal 100 in the third embodiment includes the back-surface vibrator 160 (second vibrator) in addition to the operation-surface vibrator 150. The operation-surface vibrator 150 performs a first vibration action of vibrating the operation surface 143a of the touchscreen 143. The back-surface vibrator 160 performs a second vibration action of vibrating the back surface of the terminal 100 opposite the operation surface 143a (i.e., vibrating the back surface 172a of the back casing 172). The back-surface vibrator 160 includes a vibration element 161 placed near the back surface 172a of the back casing 172 (e.g., placed on the inner surface of the back casing 172) and a vibration driver 162 that drives the vibration element 161.

The vibration element 161 of the back-surface vibrator 160 directly vibrates the back surface 172a, so that a more perceivable vibration response is sent to the hand holding the terminal 100 than the vibration response sent from the vibration elements 151 of the operation-surface vibrator 150 to the lateral casing 173. In the third embodiment, the terminal 100 in the held state performs the vibration action with the back-surface vibrator 160 to send the vibration response mainly to the hand that holds the back casing 172. The terminal 100 may also perform the vibration action with the operation-surface vibrator 150 in addition to the vibration action with the back-surface vibrator 160.

On the other hand, the terminal 100 in the placed state does not perform the vibration action with the back-surface vibrator 160 but performs the vibration action with the operation-surface vibrator 150. The terminal 100 in the placed state thus sends the vibration action to the finger on the operation surface 143a. In the third embodiment, when the terminal 100 is placed on an object, the vibration absorber 171 between the operation display unit 140 and the back casing 172 absorbs vibration transmitted from the operation-surface vibrator 150 towards the object on which the terminal 100 is placed via the back casing 172.

Figure 17:
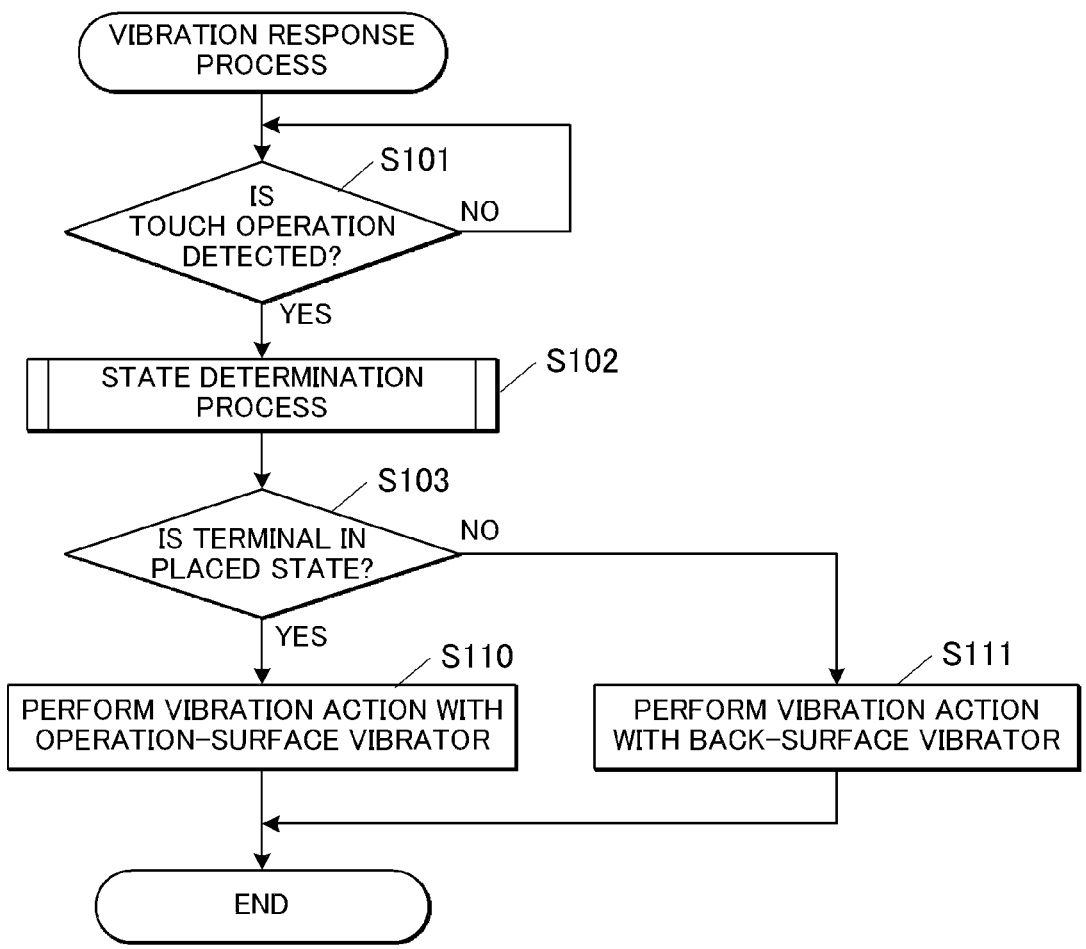
FIG. 17 is a flowchart showing control steps of the vibration response process in the third embodiment.

FIG. 17 is a flowchart showing control steps of the vibration response process to be performed by the controller 110 in the third embodiment.

The flowchart in FIG. 17 is different from the flowchart in FIG. 9 in that Steps S104 and S105 are replaced by Steps S110 and S111, respectively. Hereinafter, aspects different from the flowchart in FIG. 9 are described.

After ending the vibration response process in Step S102, the controller 110 determines whether or not the terminal 100 is in the placed state (Step S103). When determining that the terminal 100 is in the placed state (Step S103: YES), the controller 110 sends a control signal to the vibration driver 152 of the operation-surface vibrator 150 to perform the vibration action (Step S110).

When determining that the terminal 100 is not in the placed state but in the held state (Step S103: NO), the controller 110 sends a control signal to the vibration driver 162 of the back-surface vibrator 160 to perform the vibration action (Step S111).

After Step S110 or S111, the controller 110 ends the vibration response process.

As described above, the terminal 100 in the third embodiment is a portable terminal for controlling the main body 200. The terminal 100 includes: the operation display unit 140 with the touchscreen 143; the operation-surface vibrator 150 that is configured to perform a first vibration action of vibrating the operation surface 143*a* of the touchscreen 143; the back-surface vibrator 160 that is configured to perform a second vibration action of vibrating the surface of the terminal 100 opposite the operation surface 143*a*; and the controller 110. The controller 110 as the vibration control unit controls the first vibration action by the operation-surface vibrator 150 and the second vibration action by the back-surface vibrator 160. The controller 110 as the state determination unit determines whether or not the terminal 100 is in a placed state of being placed on an object. When the terminal 100 is in the placed state, the controller 110 causes the operation-surface vibrator 150 to perform the first vibration action in response to a touch operation on the operation surface 143*a*. When the terminal 100 is not in the placed state, the controller 110 causes the back-surface vibrator 160 to perform the second vibration action in response to the touch operation on the operation surface 143*a*.

According to this configuration, when the terminal 100 is in the held state, the vibration element 161 of the back-surface vibrator 160 directly vibrates the back surface 172*a*. Such a vibration response can be more perceivable to the hand holding the terminal 100 than the vibration response with the operation-surface vibrator 150, which is transmitted to the hand via the lateral casing 173.

On the other hand, when the terminal 100 is in the placed state, the terminal 100 does not perform the vibration action with the back-surface vibrator 160 but performs the vibration action with the operation-surface vibrator 150. Accordingly, the terminal 100 can avoid transmitting vibration to the main body 200 and affecting the operation of the main body 200. This also can reduce power consumption by the vibration action.

Further, the program 113*a* in the third embodiment causes the controller 110 (computer) of the terminal 100 to function as a hardware processor that: controls the first vibration action by the operation-surface vibrator 150 and the second vibration action by the back-surface vibrator 160; and determines whether or not the terminal 100 is in a placed state of being placed on an object, wherein when the terminal 100 is in the placed state, the hardware processor causes the operation-surface vibrator 150 to perform the first vibration action in response to a touch operation on the operation surface 143*a*, and when the terminal 100 is not in the placed state, the hardware processor causes the back-surface vibrator 160 to perform the second vibration action in response to the touch operation on the operation surface 143*a*.

According to the program, the terminal 100 in the held state can perform the vibration response that is more perceivable to the hand holding the terminal 100. Further, the terminal 100 in the placed state can avoid transmitting vibration to the main body 200 and affecting the operation of the main body 200. Further, power consumption by the vibration action can be reduced.

The above-described embodiments are not intended to limit the present invention and can be variously modified.

For example, whether or not the terminal 100 is placed on the cradle part 50 may not be determined by determining whether or not power is supplied to the terminal 100 by the main body 200. For example, the state of the terminal 100 may be determined on the basis of the state of a physical button that is provided to terminal 100 and that is pressed when the terminal 100 is placed on the cradle part 50.

As another example, the main body 200 may include a detection unit that detects whether or not the terminal 100 is placed on the cradle part 50 and that sends a detection signal to the terminal 100 when detecting that the terminal 100 is placed on the cradle part 50. On the basis of the detection signal, the controller 110 of the terminal 100 can determine that the terminal 100 is placed on the cradle part 50.

Further, although the cradle part 50 in the above description is electrically connectable to the terminal 100 via the connecting terminal of the supporter 52, the cradle part 50 may be a placing surface that does not have a connecting terminal to the terminal 100 and that supplies power to the terminal 100 with contactless charging technology.

Further, when effects of the vibration of the back casing 172 on the main body 200 can be ignored (e.g., the cradle part 50 is provided with a damper), the back casing 172 may be integrated with the lateral casing 173 so that the vibration of the operation-surface vibrator 150 is transmitted to the back casing 172 and the back surface 172*a*.

Further, the touchscreen 143 may not be an electrostatic capacitance type but may be a resistance film type that detects the position touched by the operating tool according to connections between electrodes.

Although embodiments of the present invention have been described and illustrated in detail, the disclosed embodiments are made for purposes of illustration and example only and not limitation. The scope of the present invention encompasses the scope of the invention recited in the claims and the equivalent thereof.

What is claimed is:

1. A portable terminal for controlling an apparatus, comprising:
    a display with a touchscreen;
    a lateral casing that covers lateral sides of the display;
    a vibrator that is configured to perform a vibration action; and
    a hardware processor that determines whether or not the terminal is in a placed state of being placed on an object and causes the vibrator to perform the vibration action in response to a touch operation on an operation surface of the touchscreen,
    wherein when the terminal is in the placed state, the hardware processor causes the vibrator to perform the vibration action at first vibration intensity to the operation surface only, and when the terminal is not in the placed state, the hardware processor causes the vibrator to perform the vibration action at second vibration intensity to both the operation surface and the lateral casing, said second vibration intensity being lower than the first vibration intensity.

2. The terminal according to claim 1, further comprising a vibration absorber that absorbs vibration propagating from the vibrator towards the object on which the terminal is placed.

3. The terminal according to claim 1, wherein the object is a cradle part of the apparatus.

4. The terminal according to claim 1, wherein the hardware processor determines that the terminal is in the placed state in response to the terminal receiving power from the apparatus.

5. The terminal according to claim 1, further comprising an inertial sensor, wherein the hardware processor determines whether or not the terminal is in the placed state based on an output of the inertial sensor.

6. A portable terminal for controlling an apparatus, comprising:
- a display with a touchscreen;
- a vibrator that is configured to perform a vibration action of vibrating at least an operation surface of the touchscreen; and
- a hardware processor that controls the vibration action of the vibrator, determines whether or not the terminal is in a placed state of being placed on an object, makes a prediction on whether a touch operation is to be performed on the operation surface by detecting an operation tool approaching the operation surface within a certain distance, and detects the touch operation performed on the operation surface with the operation tool, wherein when the terminal is in the placed state, the hardware processor causes the vibrator to start the vibration action in response to predicting the touch operation, and when the terminal is not in the placed state, the hardware processor causes the vibrator to start the vibration action in response to detecting the touch operation.

7. The terminal according to claim 6, further comprising a vibration absorber that absorbs vibration propagating from the vibrator towards the object on which the terminal is placed.

8. The terminal according to claim 6, wherein the object is a cradle part of the apparatus.

9. The terminal according to claim 6, wherein the hardware processor determines that the terminal is in the placed state in response to the terminal receiving power from the apparatus.

10. The terminal according to claim 6, further comprising an inertial sensor, wherein the hardware processor determines whether or not the terminal is in the placed state based on an output of the inertial sensor.

11. A portable terminal for controlling an apparatus, comprising:
- a display with a touchscreen;
- a first vibrator that is configured to perform a first vibration action of vibrating an operation surface of the touchscreen;
- a second vibrator that is configured to perform a second vibration action of vibrating a surface of the terminal opposite the operation surface; and
- a hardware processor that controls the first vibration action by the first vibrator and the second vibration action by the second vibrator and determines whether or not the terminal is in a placed state of being placed on an object, wherein when the terminal is in the placed state, the hardware processor causes the first vibrator to perform the first vibration action in response to a touch operation on the operation surface, and when the terminal is not in the placed state, the hardware processor causes the second vibrator to perform the second vibration action in response to the touch operation on the operation surface.

12. The terminal according to claim 11, further comprising a vibration absorber that absorbs vibration propagating from the first vibrator towards the object on which the terminal is placed.

13. The terminal according to claim 11, wherein the object is a cradle part of the apparatus.

14. The terminal according to claim 11, wherein the hardware processor determines that the terminal is in the placed state in response to the terminal receiving power from the apparatus.

15. The terminal according to claim 11, further comprising an inertial sensor, wherein the hardware processor determines whether or not the terminal is in the placed state based on an output of the inertial sensor.

16. A non-transitory computer-readable storage medium storing a program that causes a computer of a portable terminal, the terminal being for controlling an apparatus and including a display with a touchscreen, a lateral casing that covers lateral ides of the display, and a vibrator that is configured to perform a vibration action, to function as a hardware processor that:
- determines whether or not the terminal is in a placed state of being placed on an object; and
- causes the vibrator to perform the vibration action in response to a touch operation on an operation surface of the touchscreen,
- wherein when the terminal is in the placed state, the hardware processor causes the vibrator to perform the vibration action at first vibration intensity to the operation surface only, and when the terminal is not in the placed state, the hardware processor causes the vibrator to perform the vibration action at second vibration intensity to both the operation surface and the lateral casing, said second vibration intensity being lower than the first vibration intensity.

17. A non-transitory computer-readable storage medium storing a program that causes a computer of a portable terminal, the terminal being for controlling an apparatus and including a display with a touchscreen and a vibrator that is configured to perform a vibration action of vibrating at least an operation surface of the touchscreen, to function as a hardware processor that:
- controls the vibration action of the vibrator; determines whether or not the terminal is in a placed state of being placed on an object;
- makes a prediction on whether a touch operation is to be performed on the operation surface by detecting an operation tool approaching the operation surface within a certain distance; and
- detects the touch operation performed on the operation surface with the operation tool, wherein when the terminal is in the placed state, the hardware processor causes the vibrator to start the vibration action in response to predicting the touch operation, and when the terminal is not in the placed state, the hardware processor causes the vibrator to start the vibration action in response to detecting the touch operation.

18. A non-transitory computer-readable storage medium storing a program that causes a computer of a portable terminal, the terminal being for controlling an apparatus and including: a display with a touchscreen; a first vibrator that is configured to perform a first vibration action of vibrating an operation surface of the touchscreen; and a second vibrator that is configured to perform a second vibration action of vibrating a surface of the terminal opposite the operation surface, to function as a hardware processor that:
- controls the first vibration action by the first vibrator and the second vibration action by the second vibrator; and
- determines whether or not the terminal is in a placed state of being placed on an object, wherein when the terminal is in the placed state, the hardware processor causes the first vibrator to perform the first vibration action in response to a touch operation on the operation surface, and when the terminal is not in the placed state, the hardware processor causes the second vibrator to perform the second vibration action in response to the touch operation on the operation surface.

\* \* \* \* \*